United States Patent
Su et al.

[11] Patent Number: 6,099,764
[45] Date of Patent: Aug. 8, 2000

[54] METHOD OF LENS CASTING WITHOUT USING A GASKET

[75] Inventors: Kai C. Su; Richard Lu, both of Alpharetta, Ga.

[73] Assignee: Technology Resources International Corporation, Alpharetta, Ga.

[21] Appl. No.: 09/273,292

[22] Filed: Mar. 19, 1999

[51] Int. Cl.$^7$ .................................................... B29D 11/00
[52] U.S. Cl. ............................ 264/2.2; 264/2.5; 249/82; 249/105; 249/154; 425/808
[58] Field of Search ........................... 264/2.2, 2.5, 1.38, 264/1.1, 1.36; 425/808, 423; 249/82, 105, 108, 139, 154

[56] References Cited

U.S. PATENT DOCUMENTS

| | | |
|---|---|---|
| 2,406,361 | 8/1946 | Fairbank et al. . |
| 2,431,927 | 12/1947 | Fairbank ................................. 425/808 |
| 2,443,826 | 6/1948 | Johnson . |
| 2,964,501 | 12/1960 | Sarofeen ................................ 425/808 |
| 3,136,000 | 6/1964 | Slyk ........................................ 425/808 |
| 3,211,811 | 10/1965 | Lanman . |
| 4,166,088 | 8/1979 | Neefe . |
| 4,497,754 | 2/1985 | Padoan . |
| 5,213,825 | 5/1993 | Shimizu et al. ......................... 425/595 |
| 5,372,755 | 12/1994 | Stoerr et al. ............................ 264/1.27 |
| 5,415,817 | 5/1995 | Shiao et al. .............................. 264/2.2 |
| 5,512,221 | 4/1996 | Maus et al. ............................... 264/2.5 |
| 5,547,618 | 8/1996 | Magne .................................... 264/1.36 |
| 5,605,656 | 2/1997 | Sasano ..................................... 264/1.1 |
| 5,611,969 | 3/1997 | Cano et al. ............................... 264/2.5 |
| 5,662,839 | 9/1997 | Magne .................................... 264/1.38 |
| 5,880,171 | 3/1999 | Lim et al. . |

*Primary Examiner*—Mathieu D. Vargot
*Attorney, Agent, or Firm*—Needle & Rosenberg, P.C.

[57] ABSTRACT

An apparatus and method for casting lens without using a gasket that can be used to form all powers and geometric shapes of lenses. An elastomeric strip is used to wrap around the edges of two molds to form a sleeve-like structure, which in turn cooperates with the molds to form a molding cavity. Moreover, this sleeve-like structure does not crumple or shrink during the lens polymerization process. Instead, it allows the molds to slide axially within it to compensate for any shrinkage that occurs during the lens polymerization process.

24 Claims, 3 Drawing Sheets

METHOD OF LENS CASTING WITHOUT USING A GASKET

BACKGROUND OF THE INVENTION

1. Field of the Invention

The present invention comprises an apparatus and method for lens casting without using a gasket.

2. Background Art

Most lenses today are made by molding plastic because of its light weight, density, refractive index, and impact resistance. To form a lens, two molds, often referred as a front mold and a back mold in the art of lens making, are used. Each mold has a facing inside surface. When these two molds are properly positioned at a desired distance and rotational orientation to each other, their facing inside surfaces are a negative image of the surfaces of the lens to be formed. A closure member is used to necessarily seal the cavity. Then a fluid lens-forming mixture, normally a liquid monomer, is placed and contained in the cavity defined by the two molds and the closure member. Once the fluid lens-forming mixture is in the cavity, it is cured to form a hardened polymeric lens taking the shape of the molds.

Figure 1:
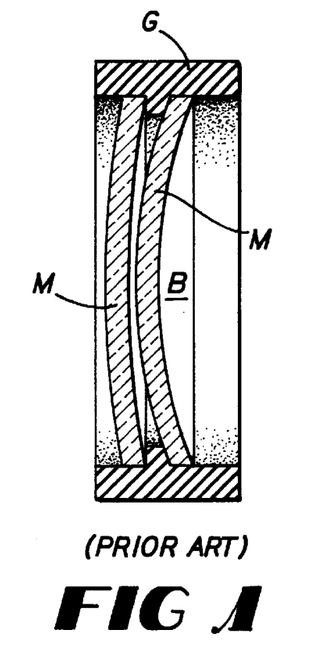
FIG. 1 is a cross-sectional view of a prior art T-gasket.

Two kinds of closure member are now used in making the lenses. The first kind of closure member is a gasket, which has been used widely in the art. Currently available gaskets are known as T-gaskets. As shown in FIG. 1 in cross-section, a T-gasket G has a bore B and two ends that each complementarily receives a respective mold M. Once the molds are nested within the T-gasket G, the molds are not allowed to move axially relative to each other. Different T-gaskets G are required to form varying power lenses because each T-gasket G sets a predetermined axial separation between molds M. That is, one T-gasket G sets the molds farther apart to form a lens of a greater power compared with another T-gasket G used to form a lower power lens. Accordingly, manufacturers must maintain separate T-gaskets for a +2 lens, another for a −3 lens, another for a −4 lens, etc. In other words, in order to meet the requirements of various possible types and powers of lenses, a portfolio of different T-gaskets over a wide range of different geometrical characteristics is needed. Not only is it costly to create and keep such a portfolio, but even with a portfolio it is sometime still impossible to meet timely a customer's need because that customer may require a lense with power or type outside the portfolio, and then a customer-tailored T-gasket has to be made.

Second kind of closure member has been proposed as an alternative. Namely, a closure member can be made by wrapping a strip around the edges of the molds and thus a molding cavity can be created on demand in situ at the last minute by the molds and the strip. A number of references disclose various ways to achieve this goal. One group of references disclose lens casting using two molds joined together using a strip by gluing or using adhesive tape to attach the strip to the molds to form a molding cavity. U.S. Pat. No. 5,213,825 issued to Shimizu et al., U.S. Pat. No. 4,497,754 issued to Padoan, U.S. Pat. No. 3,211,811 issued to Lanman, and U.S. Pat. Nos. 5,547,618 and 5,662,839 issued to Magne are some examples in this category. One drawback related to this approach is that traces of adhesives may remain on the molds and on the finished lens and, hence, a specific cleaning procedure must be utilized to clean up the adhesives. Moreover, because the molds are held firmly by adhesives once the molds are assembled and the molding cavity is formed, the molds cannot move relative to the tape, or within the tape during the lens casting process.

Avoiding the drawbacks caused by adhesives, another group of references disclose lens casting simply using a strip of heat shrinkable synthetic material or similar deformable material to cooperate with the molds to form a molding cavity. For examples, U.S. Pat. No. 2,406,361 issued to Fairbank et al. and U.S. Pat. No. 5,611,969 issued to Cano et al. both disclose just using such tape to form the cavity into which monomer is injected. While this approach may have succeeded in avoiding the drawbacks caused by adhesives, it also does not allow the molds to move relative to the tape or within the tape once the molds are assembled and the molding cavity is formed. Therefore, to compensate any shrinkage of the lens forming material during the lens casting process, the tape used in these references must crumple or wrinkle, as clearly shown in FIG. 10 of the Cano patent and explained in Col. 4, lines 17–22 of the Fairbank patent. However, because the tape may not be crumpled or wrinkled uniformly under the pressure of the molds during the lens polymerization process, it may negatively impact the quality of the lens to be molded. Moreover, because the tape is heated to shrink it onto the molds tightly, separating the tape from the molds once the lens is made requires special care and extra effort, which increases labor cost and impedes automation of the molding process. Furthermore, all cited references which disclose using the tape arrangement do not have the flexibility to adjust the relative axial positions of the molds once the molds are closed with the tape. If a mistake is made in setting up an appropriate axial positions of the molds, the tape has to be unwrapped and the whole process has to start over again.

SUMMARY OF THE INVENTION

The present invention overcomes the disadvantages of the prior art and discloses an entirely new closure member used for molding lens. Specifically, the present invention encompasses an apparatus and method for casting lens without a gasket that can be used to form all powers and geometric shapes of lenses, unlike the prior art T-gasket which is limited to forming one specific lens. The present invention uses an elastomeric strip to wrap around the edges of two molds to form a sleeve-like structure, this sleeve-like structure in turn cooperates with the molds to form a molding cavity. Moreover, this sleeve-like structure does not crumple or shrink during the entire lens polymerization process. Instead, it allows the molds to move axially or slide within it to compensate for any shrinkage that occurs during the lens polymerization process, unlike the prior art tape closure element which does not allow the molds to move axially within it and hence has to crumple or wrinkle to compensate the shrinkage.

The elastomeric strip of the present invention is nonadhesive and relatively soft and thick so that when it is wrapped around the front mold and the rear mold, it forms a sleeve containing the molds. Because the strip can easily fit around various molds used to form multiple powers of the lenses and different lens surfaces, this invention eliminates any and all drawbacks imposed on the lens-forming process by the T-gasket arrangement as well as the tape arrangement in the prior art.

Additionally, as those skilled in the art are aware and appreciate, the prior art tape positions and holds the molds at a set separation by adhesives or tape or both, which presents a problem because the volume of monomer shrinks approximately ten to fifteen percent when it is cured. Since the molds remain attached to the tape arrangement, this shrinkage forces the tape to crumple or wrinkle. Because the tape may crumple or wrinkle nonuniformly, it may create internal stresses in the lens so that annealing is sometimes required. In contrast, the sleeve arrangement of the present invention reduces or avoids stresses by allowing the molds to move within the sleeve axially as the monomer volume shrinks during curing. Thus, annealing is usually not needed for lenses made with the elastomeric sleeve arrangement of the present invention.

Furthermore, because the sleeve arrangement of the present invention allows the molds to move axially, the relative axial positions of the molds can be adjusted even after the molding cavity is formed and the casting is in progress to insure proper relative axial position required by the lens to be molded.

Moreover, the sleeve arrangement of the present invention can be formed by fastening the two ends of the strip together, which in turn forms a "tail". This "tail" can be used to handle the molds (and the lens after it is formed as a whole) during the casting process. Indeed, because the elastomeric sleeve with a tail in this embodiment effectively provides a protection layer to the molds and a handler, the present invention makes automation easy. Optionally, by using a strip with a recess, a sleeve can be formed to have recess that provides a venting channel and a fluid communication to the molding cavity.

According to a preferred embodiment of the invention, the casting method of the present invention encompasses positioning at least one of the two molds both rotationally and axially relative to the other mold so that a lens of the correct thickness and power can be formed therebetween. That is, rather than relying on the T-gasket design for setting the dimensions of the lens, the present invention uses automation technology, including state-of-the-art motion control devices having exacting tolerances, to position the molds at the appropriate axial separation distance from each other. The present invention also uses automated technology for rotating the molds relative to each other to the proper orientation, e.g., the toric back surface mold is rotated to be properly aligned with the add power. The automation technology used in the present invention is described in detail U.S. pat. appl. Ser. No. 09/026,222 filed on Feb. 19, 1998, which is incorporated here in its entirety by reference.

Once the front mold and the back mold are positioned at a desired distance and rotational orientation to each other to form a particular lens type and power, an elastomeric strip is wrapped around the edges of the two molds to form a tubular sleeve with a diameter. The tubular sleeve contains the front mold and the back fold and cooperates with the two molds to form a closed molding cavity. The sleeve has a radial axis and a longitudinal axis. The material to make the sleeve is elastomeric, nonadhesive, relatively soft and thick, and with a friction coefficient to have an inner surface of the sleeve smooth enough to allow the molds to move axially when monomer shrinks and stiff enough to seal the edges of the molds tightly.

The desired lens is then formed by injecting the monomer into the cavity defined by the two molds and the sleeve. The monomer is injected by a filling needle piercing through the sleeve, instead of pouring the monomer into the gasket and spilling the excess off when the rear mold is positioned onto the gasket. The filling method used with the present invention significantly reduces the quantity of monomer wasted and decreases the chances of air bubbles being formed into the lens. Moreover, the elastomeric character of the sleeve insures that no unnecessary air is introduced into the molding cavity and no monomer escapes from the molding cavity. Furthermore, the relative axial positions of the molds can be monitored constantly during the process and fine-tuned if needed to insure that the molds are positioned properly.

Once the molding cavity is filled with proper amount of monomer, the monomer is cured and hardened. During this curing process, the volume of the monomer shrinks significantly. The molds slide within the sleeve along the longitudinal axis to compensate the shrinkage. There is no internal stress created in the lens because the molds can so move. Moreover, the diameter of the sleeve remains substantially constant during the curing period.

Lens manufacturing is more economic and efficient using the present invention because the quantity of lens mold equipment necessary for lens manufacturing is significantly reduced, in fact, the stock of the gaskets can be entirely eliminated, as well as drastically reducing—if not eliminating—use of the hand-labor previously involved in forming the lenses, such as cleaning the adhesives or residues on molds when adhesives and shrinkable material are used.

Furthermore, lenses produced using the present invention are improved over the prior art, especially better than semi-finished lenses, known as "semis." Unlike the direct polymerization lens, a semi lens has a concave, unfinished side that is surfaced after the curing process is completed. Thus, instead of forming the lens to be mounted into glasses with few finishing actions, the semi lens only has a single finished surface formed by a mold and the other surface is mechanically finished after the lens has been cured. The quality of the machined finished surface of a cut and polished lens from a semi is lower than that produced directly by a glass mold. As one skilled in the art appreciates, craftsmen form the front and rear glass molds by expending a tremendous number of hours cutting, grinding, and polishing the molds to make them as perfect as possible, whereas often a lens surface cut by a generator may lack this precision. The availability of adjusting the relative axial positions of the molds during the entire lens forming process offered by the present invention insures that the advantages of glass molds can be fully explored.

The present invention accordingly aims to achieve at least one or combinations of the following objectives:

To provide a new apparatus and method for producing multiple types and powers of lenses without using a gasket.

To provide a new apparatus and method for producing better multiple types and powers of lenses at a reduced cost with less labor.

To provide a new apparatus for producing multiple types and powers of lenses that uses two molds, or a front mold and a back mold, and a tabular sleeve to form a molding cavity, wherein the tabular sleeve allows the two molds to move axially to adjust the relative axial positions of the two molds.

To provide a new apparatus for producing multiple types and powers of lenses that uses two molds, or a front mold and a back mold, and a plastic sleeve to form a molding cavity, wherein the plastic sleeve can be pierced by a filling needle so that a fluid lens-forming mixture can be placed into the molding cavity through the filling needle.

To provide a new apparatus for producing multiple types and powers of lenses that uses two molds, or a front mold and a back mold, and a plastic sleeve to form a molding cavity to receive a fluid lens-forming mixture, wherein the plastic sleeve is nonadhesive and allows the two molds to move axially during the curing process to compensate any shrinkage that occurs when the fluid lens-forming mixture is cured.

To provide a new apparatus for producing multiple types and powers of lenses that uses two molds, or a front mold and a back mold, and a plastic sleeve to at least partially contain the two molds to form a molding cavity, wherein the plastic sleeve can be used to handle the molds (and the lens after it is formed) as an integral unit for improved automation.

To provide a new method for producing multiple types and powers of lenses that positions two molds at a desired distance and rotational orientation to each other, wraps an elastomeric strip around the edges of the molds to form a sleeve so that the sleeve and the molds form a molding cavity, wherein the sleeve allows the two molds to move axially, and places a fluid lens-forming mixture into the cavity for molding a lens.

To provide a new method for making a mold for molding an optical lens without a gasket that positions two molds at a desired distance and rotational orientation to each other and wraps an elastomeric strip around the edges of the molds to form a sleeve so that the sleeve and the molds define a molding cavity, wherein the sleeve allows the two molds to move axially during the molding of the optical lens.

Other objects, advantages and uses for the present invention will be more clearly understood by reference to the remainder of this document.

DETAILED DESCRIPTION OF THE INVENTION

The present invention is more particularly described in the following examples that are intended as illustrative only since numerous modifications and variations therein will be apparent to those skilled in the art. As used in the specification and in the claims, "a" can mean one or more, depending upon the context in which it is used. The preferred embodiment is now described with reference to the figures, in which like numbers indicate like parts throughout the figures.

Overview

Referring generally to FIGS. 2–10, the present invention comprises an apparatus and method of lens casting without using a gasket therefor.

The Sleeve of the Present Invention

Figure 2:
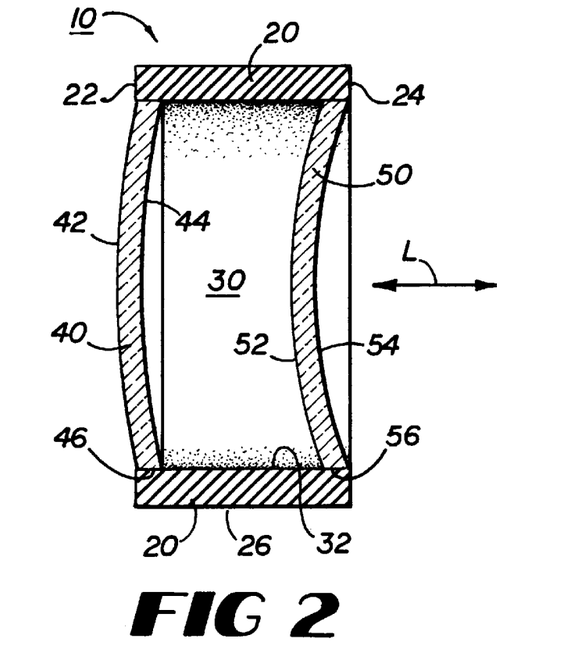
FIG. 2 is a cross-sectional view of a complete mold assembly of the present invention.
Figure 3:
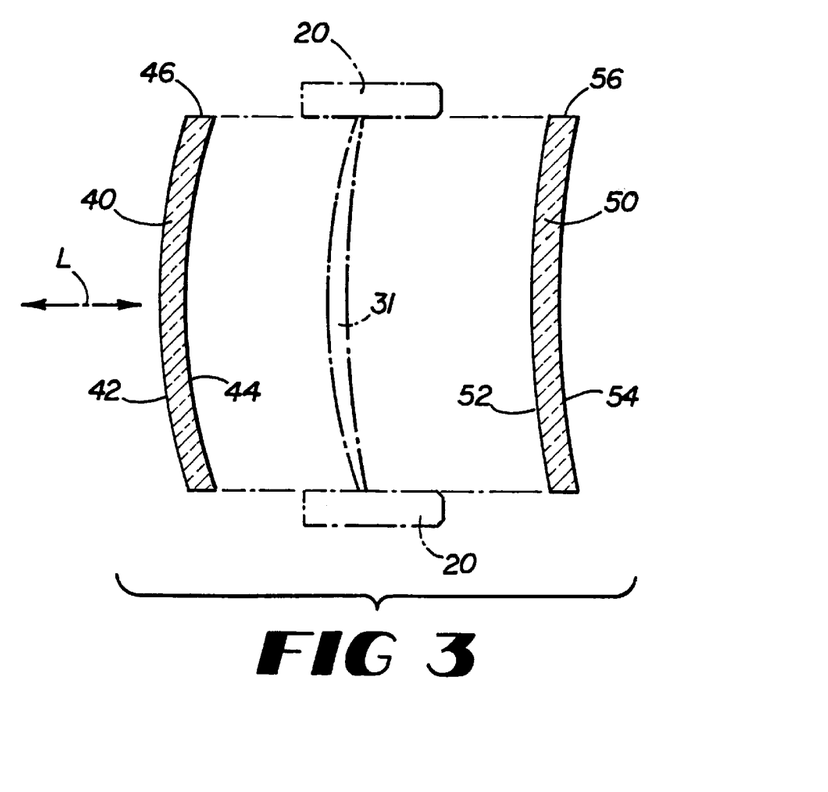
FIG. 3 is an exploded cross-sectional view of the molds and the sleeve, in which a molding cavity is shown.

Sleeve 20 of the present invention can be used as a closure member to form a molding cavity 31 in cooperation with front mold 40 and back mold 50 for molding lenses of varying power, unlike prior art gaskets that require a different design for each lens variant to be formed thereby. Sleeve 20 allows the front mold 40 and the back mold 50 to slide within it axially, unlike prior art closure member using tape-arrangement that prohibits such movement. Referring to FIG. 2, the sleeve 20 of the present invention has a first end 22, an opposed second end 24, a body portion joining the first end 22 to the second end 24, and a longitudinal, or axially, extending axis L. The sleeve 20 has an outer surface 26 and defines a bore 30 extending axially through the sleeve 20 between its opposed ends 22, 24. The bore 30 forms an interior surface 32 that circumscribes the longitudinal axis L of the sleeve 20.

The inner surface 32 and outer surface 26 of the sleeve 20 always take the shape of the edges 46, 56 of the molds 40, 50. Because the molds 40, 50 are preferably circular or annular, the preferred embodiment of the sleeve 20 is essentially tubular in front view. Although other shapes can be used (e.g., an elliptical cross-section, a polygonal cross-section, or other non-circular shape), the circular cross-sectional embodiment is preferred for its acceptance in the art, manufacturing considerations, and ease of automation.

The bore 30 of the sleeve 20 receives both a front mold 40 and a back mold 50 therein. As shown in FIG. 2, the front mold 40 has a forward surface 42, an opposed back surface 44, and an edge 46 circumscribing it. The edge 46 and the interior surface 32 of the sleeve 20 are complementary to each other in size to form a substantially leak-proof seal therebetween.

Figures 4, 5, 6, 10:
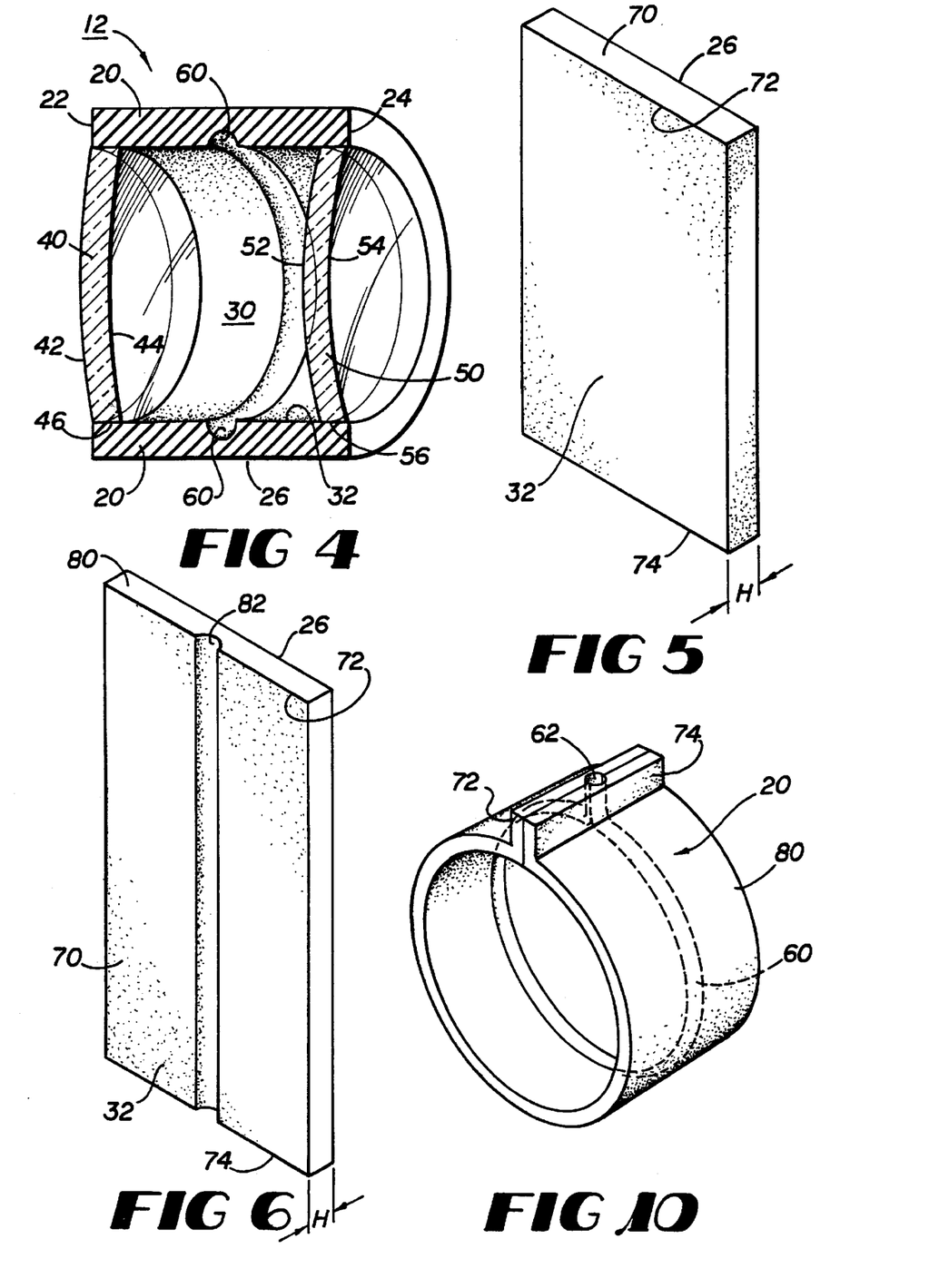
FIG. 4 is a cross-sectional view of an alternative embodiment of the mold assembly of the present invention.
FIG. 5 is a perspective view of a strip used in the present invention.
FIG. 6 is a perspective view of an alternative embodiment of the strip used in the present invention.
FIG. 10 is a perspective view of an alternative embodiment of the complete mold assembly, partially in schematic, of the present invention.
Figure 9:
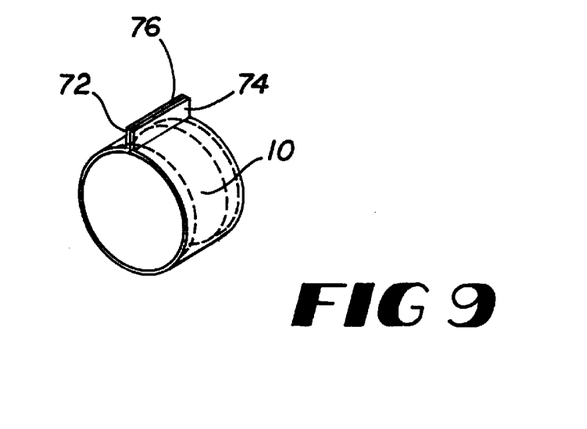
FIG. 9 is a perspective view of a complete mold assembly, partially in schematic, of the present invention.

The back mold 50 likewise has a forward surface 52, an opposed back surface 54, and a edge 56 circumscribing it. The edge 56 and the interior surface 32 of the sleeve 20 are also complementary to each other in size to form a substantially leak-proof seal therebetween. Since the molds 40, 50 preferably are circular and have a substantially identical diameter, the preferred embodiment of the sleeve 20 is also circular in cross-section as shown in FIGS. 9 and 10. Indeed, the preferred embodiment of the sleeve 20 is a tubular structure, so that the bore 30 extends through the opposing ends 22, 24 with a substantially constant diameter. When the front mold 40 and the back mold 50 are both positioned within the bore 30 of the sleeve 20 as shown in FIGS. 2 and 9, the combination of components is called a lens-forming assembly 10, a lens-forming structure, or a lens casting cell.

A cavity 31 is formed by the back surface 44 of the front mold 40, the forward surface 52 of the back mold 50 and at least a portion of the interior surface 32 of the sleeve 20 when the molds 40, 50 are closed by the sleeve 20. That is, the molds 40, 50 are positioned in a spaced-apart relationship within the bore 30 so that the cavity 31 is formed therebetween. This cavity 31 preferably has appropriate dimensions to form a desired lens when a lens-forming fluid is injected into the cavity 31 and cured therein. The cavity 31 is also shown in phantom in FIG. 3.

Alternatively, as shown in FIG. 4, sleeve 20 may have an optional recess 60 located on the interior surface 32. The recess 60 is a continuous channel across the interior surface 32. Preferably, the recess 60 is located around the middle section of the sleeve 20 so that the recess 60 can be conveniently used as a venting channel and/or a passage for providing fluid communication between the cavity 31 and a fluid reservoir (not shown) once sleeve 20 is utilized in a lens-formning assembly 12, as shown in FIG. 10. Obviously, the recess 60 may be located elsewhere per a user's choice as long as the recess 60 can be in fluid communication with the lens-forming fluid filled in the cavity 31. Moreover, the recess 60 may be square, rectangular, circular, oval, semi-oval, semi-circular, or other proper geometrical shapes cross-sectionally. For the embodiment of the present invention shown in FIGS. 4 and 6, the recess 60 is semi-circular cross-sectionally.

The lens-forming fluid is preferably a monomer. The preferred monomer is manufactured by P.P.G. located at Pittsburgh, Pa., and sold under the tradename CR 424. As one skilled in the art will appreciate, other lens-forming fluids known in the art can be used with the present invention.

The front mold 40 or the back mold 50 is axially movable within the bore 30 relative to the other mold to a desired one of a plurality of axial separation distances between the molds. Alternatively, both molds 40, 50 can move axially. The volume of the cavity 31 is different for each axial separation distance between the front mold 40 and the back mold 50 and, accordingly, the dimensions of the lens formed within the cavity 31 are also different for each axial separation distance. The filling of the monomer can be done at a filling station. The filling station of the present invention is automated by using computer subsystem (or a controller such as a computer or microprocessor), robotic arm and linear actuators or servo motors to position the back mold 50 exactly at a predetermined position relative to the front mold 40 in the bore 30, as discussed in great detail in U.S. pat. appl. Ser. No. 09/026,222. Since the automation includes state-of-the-art motion control devices having exacting tolerances, the quality of the lens that the present invention produces is improved over prior art systems.

In this embodiment, the sleeve 20 of the present invention is designed to be used with automation technology and has a substantially constant diameter along the interior surface 32 of the bore 30 between the first end 22 and second end 24 of the sleeve 20. The diameter of the back mold 50 is substantially the same as the diameter of the sleeve 20 so that the back mold 50 can be slid therealong axially, in both directions, within the bore 30 to the desired axial separation distance from the front mold 40. The front mold 40 likewise can also move within the bore to make or keep the desired axial separation from the back mold 50. In order for the front mold 40 and back mold 50 to do so, the interior surface 32 has to be rather smooth. The smoothness of the interior surface 32 also insures that the interior surface 32 seals against the edges 46, 56 of the front mold 40 and back mold 50 tightly. As discussed above, when the front mold 40 and back mold 50 are both positioned within the bore 30 of the sleeve 20, the cavity 31 defined by the molds 40, 50 and the interior surface 32 of the sleeve 20 can hold a fluid, such as the liquid monomer, without leaking.

The lens forming material, such as the liquid monomer, is introduced into the cavity 31 preferably through injecting method known in the art. The liquid monomer is preferably injected into the cavity 31 by a filling needle (not shown). The filling needle pierces through the sleeve 20 into the cavity 31 and hence establishes a fluid communication channel between the cavity 31 and an outside reservoir of the liquid monomer, so that a proper amount of the liquid monomer is filled. For the embodiment shown in FIGS. 4 and 10, additionally, the liquid monomer can be alternatively introduced into the cavity 31 through the recess 60, with or without a filling needle.

Another aspect of the sleeve 20 of the present invention is the sleeve material. In the presently preferred embodiment, a desirable characteristic is that the sleeve material is nonadhesive where the interior surface 32 is formed, so that it does not prohibit the axial movement of the molds 40, 50. Moreover, the sleeve material is relatively soft, so that it can be wrapped around against the edges of the molds to form a sleeve. Furthermore, the sleeve material is elastomeric, so that once the sleeve 20 is formed and the front mold 40 and back mold 50 are contained within the sleeve 20, the tension of the elastomeric material forces the sleeve 20 tightly against the edges of the molds 40, 50 along the radial axis. Still another aspect of the sleeve material is that it is chemically compatible with the lens-forming fluid to avoid inhibiting polymerization of the fluid. Another aspect of the sleeve material is that it is relatively thick so that it can sustain the tension force. FIG. 5 shows a strip 70 of elastomeric material which can be used to form sleeve 20. FIG. 6 shows an alternative strip 80 which can also be used to form sleeve 20 of the present invention. The strip 70 has two opposing ends 72, 74, two opposing surfaces 26, 32 and a thickness H between the surfaces 26 and 32. Surfaces 26, 32 are flat. Alternatively, surface 32 may have a recess 82, extending from end 72 to end 74, as shown in FIG. 6. The preferred range of thickness H is 1 millimeter to 8 millimeter, more preferably 2 millimeter to 6 millimeter and optimally 3 millimeter to 4 millimeter.

In the presently preferred embodiment, a suitable sleeve material is thermoplastic rubber that contains KRATON®G, a styrene-ethylene-propylene(butylene) block copolymer, sold by Shell Oil Company® of Houston, Tex. Such rubber includes those sold under the trade names DYNAFLEX®G2703, 2711, and 2712 by GLS Corporation of Cary, Ill. These rubbers have a Shore A hardness ranging from about 43 to 62, a specific gravity of about 0.9 g/cc, a tensile modulus at 300% elongation ranging from about 355 to 470, tensile strength at break of about 680 to 1000 psi, and a tear strength of about 113 to 127. These rubbers have smooth surfaces and have a thickness in a range of 1 mm–8 mm. The sleeve material of the present invention, however, is not limited to a single material. In fact, the desired sleeve material can be very depending on the specific monomer compound used to form the lens. That is, a certain sleeve material may be preferred with a particular lens-forming fluid and different type of sleeve material with another lens material. Among many available materials, it is found that the present invention can be satisfactorily practiced with polyurethane, polyvinyl chloride, organosilicon elastomer as well as KRATON®G.

The Method and Apparatus of Lens Casting

Figure 7:
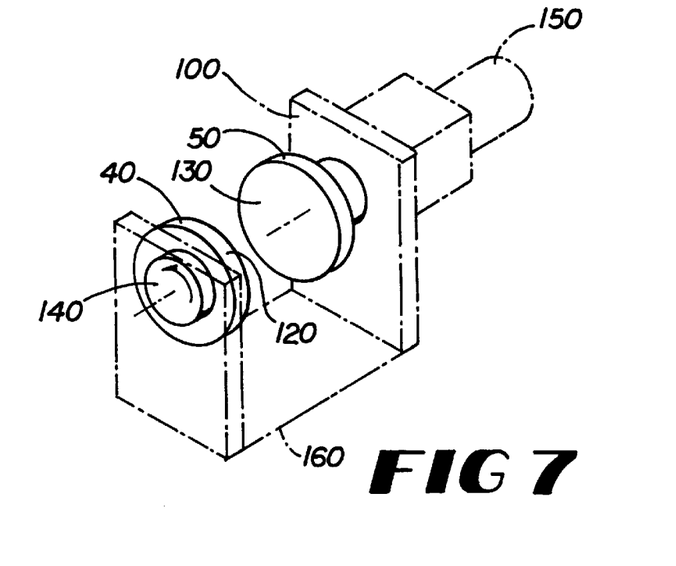
FIG. 7 is a perspective view of an assembly station used in the present invention, partially in schematic, showing the molds are positioned on the assembly station.
Figure 8:
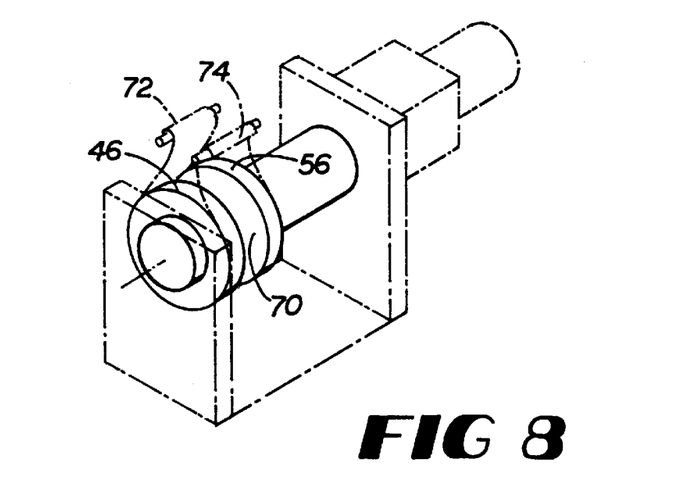
FIG. 8 is a perspective view of FIG. 7, partially in schematic, showing an elastomeric strip used to wrap around the edges of the molds according to the present invention.

Referring now to FIGS. 7–9, the lens-forming assembly 10 is processed at an assembly station 100. In the preferred embodiment, the molds 40, 50 are rotationally aligned relative to each other and axially positioned apart from each other at the desired axial separation distance (e.g., the appropriate separation to produce a lens of a desired thickness). A strip 70 of elastomeric material is wrapped tightly around the edges of the molds 40, 50 to form a tubular sleeve 20 having a bore 30. The sleeve 20 cooperates with the molds 40, 50 to form a molding cavity 31. The lens-forming fluid is then injected into the cavity 31. In the subsequent curing process, the molds 40, 50 slide along the longitudinal axis within the sleeve 20 to compensate for any shrinkage which occurs.

The assembly station 100 preferably has two holding members: a front mold holder 120 and a back mold holder 130. In the preferred embodiment, both the mold holders 120, 130 have vacuum suction that engages the respective molds 40, 50. The assembly station 100 also has two positioning members: a mold orientation control 140 and a center thickness control 150. All holding and positioning members are supported by a frame 160.

In operation, as shown in FIG. 7, the molds 40, 50 are held by the mold holders 120, 130, respectively. The back surface 44 of the front mold 40 and the forward surface 52 of the back mold are facing to each other. The center thickness control 150 moves the back mold holder 130 with the back mold 50 axially, towards or away from the front mold 40, until a desired axial distance between the front mold 40 and the back mold 50 is achieved. The mold orientation control 140 rotates the front mold holder 120 with the front mold 40, either clockwise or counterclockwise, until a desired rotational orientation between the front mold 40 and the back mold 50 is achieved. Alternatively, the rear mold holder 130 can be rotated. These motions can be controlled either manually or automatically.

Once the two molds 40, 50 are positioned at a desired distance and rotational orientation to each other to form a particular lens type and power, the strip 70 of elastomeric material is wrapped tightly around the edges 46, 56 of the molds 40, 50 to form a tubular sleeve 20 with a bore 30. FIG. 8 schematically shows such a wrapping is in progress and FIG. 9 shows a completed mold assembly 10. After winding the strip 70 around the edges 46, 56 of the molds 40, 50, the two ends 72, 74 of the strip 70 are fastened together to close the molding cavity 31.

As shown in FIG. 9, the two ends 72, 74 of the strip 70 are preferably fastened together to form a tail 76. Different means may be utilized to form the tail 76. They can be locally sealed by heat, or they can be sealed by adhesives. Because the adhesives are applied between the two ends of the strip 70, unlike in the prior art where adhesives were applied between the strip and the molds, adhesive contamination on the molds is avoided. Alternatively, they can be fastened together by a clamp (not shown) to eliminate the use of adhesives entirely. This clamp may conveniently hold the tail 76 and then transfer the mold assembly 10 to next stop, such as the filling station (not shown), for further processing.

Same process can be utilized to form a mold assembly 12 as shown in FIG. 10. The only difference between the mold assembly 10 and the mold assembly 12 is that the mold assembly 12 has a recess channel 60 having a port 62 open to the ambient air that is formed by the portion of the recess channel 60 at the end 72 and the portion of the recess channel 60 at the end 74 when the ends 72 and 74 of the strip 80 are fastened together as shown in FIG. 10 to form sleeve 20, which may be used as a venting channel and/or a passage to establishing a fluid communication between the cavity 31 and the outside.

Now the fluid lens-forming material, preferably a monomer, is introduced into the molding cavity 31. This can be done at the assembly station 100 or at an automated filling station discussed above. Either way, a filling needle (not shown) is used for injecting a desired amount of the lens-forming fluid into the cavity 31. The filling needle is connected to a reservoir of the fluid lens-forming material. The filling needle pierces through the sleeve 20 into the cavity 31 and thus establishes a fluid communication channel between the reservoir and the cavity 31. As known in the art, a computer system (not shown) can be utilized to control the amount of the lens-forming material to be filled in connection with, for example, a vacuum sensor (not shown). As one skilled in the art will appreciate, other sensors can be used to detect when the sleeve 20 is filled with monomer, such as an electronic eye (not shown), other optic sensors (not shown), and the like. Before the fluid lens-forming material is filled in, the center thickness control 150 can be fine-tuned to adjust the axial relative positions of the molds 40, 50 if necessary.

Once a proper amount of the fluid lens-forming material is introduced into the cavity 31, the filling needle withdraws from the cavity 31 and the sleeve 20. The elastomeric character of the sleeve 20 insures that no unnecessary air is introduced into and no fluid lens-forming material escapes from the cavity 31. The fluid lens-fonning material is then cured and hardened. As one skilled in the art will appreciate, curing can be accomplished in a number of ways. For example, the curing method of the present invention involves exposing the fluid lens-forming material to an ultraviolet ("UV") light for a desired time. Alternatively, after exposing the fluid lens-forming material to UV light, the fluid lens-forming material is then heated for a predetermined time, such as in an infra-red ("IR") oven. The second heating step solidifies the fluid lens-forming material to form the hardened lens if not sufficiently cured in the UV step.

During the curing process, the volume of the fluid lens-forming material shrinks approximately ten to fifteen percent. To compensate the shrinkage, the molds 40, 50 slide axially along the bore 30 of the sleeve 20. As a result, the stresses within the lens are reduced and thus a better lens is produced. The molds in the prior art T-gasket, in contrast, remain stationary, regardless of the stresses from shrinkage, while the molds in the prior-art tape arrangement drag the tape or strip to make it crumple or wrinkle.

After the fluid lens forming material is cured, the solidified lens must be separated from the sleeve 20 and molds 40, 50. Since the sleeve 20 is flexible, the two molds 40, 50 and the lens sandwiched therebetween can easily be slid out of the sleeve 20. Or, if the sleeve 20 is formed by a clamp holding the ends 72, 74 together as discussed above, the clamp can just release the ends 72, 74 and then the two molds and the lens can be taken out. Alternatively, the sleeve can be just simply torn off.

Although the present invention has been described with reference to specific details of certain embodiments thereof, it is not intended that such details should be regarded as limitations upon the scope of the invention except as and to the extent that they are included in the accompanying claims. Many modifications and variations are possible in light of the above disclosure.

For example, the invention has been described with reference to use a strip of elastomeric material to wrap around the edges of the molds to form a sleeve in situ. The sleeve, however, may be manufactured beforehand. For instance, sleeves can be cut from tubes of elastomeric material. Different needs due to various possible types and powers of lenses may be met by making sleeves from tubes with various diameters.

What is claimed is:

1. A method for molding an optical lens without using a gasket, comprising the steps of:
   a. positioning a front mold and a back mold whose facing inside surfaces are a negative image of the surfaces of the optical lens at a proper distance and rotational orientation to each other, both the front mold and back mold having an edge;
   b. wrapping around the edges of the front mold and back mold with a strip to form a sleeve, wherein the strip has a first end and an opposed second end, an interior surface and an opposed outer surface, and a recess channel formed on the inside surface extending from the first end to the second end, and wherein the formed sleeve has a longitudinal axis and a diameter and cooperates with the front mold and back mold to define a molding cavity, the molding cavity in fluid communication with the recess channel;
   c. injecting a fluid lens-forming material into the molding cavity through the recess channel; and
   d. curing the fluid lens-forming material so that the fluid lens-forming material is hardened to form the optical lens, wherein the sleeve allows the front mold and back mold to slide along at least a portion of the longitudinal axis and the diameter of the sleeve remains substantially constant during the curing of the fluid lens-forming material.

2. The method of claim 1, wherein the strip is made from a nonadhesive plastic film.

3. The method of claim 2, wherein the nonadhesive plastic film comprises an elastomeric material selected from the group of polyurethane, polyvinyl chloride, organosilicon elastomer and thermoplastic rubbers containing a styrene-ethylene-propylene(butylene) block copolymer.

4. The method of claim 2, wherein the thickness of the non-adhesive plastic film is between 1.0 millimeter and 8.0 millimeter.

5. The method of claim 1, further comprising the step of fastening the first and second ends of the strip together to close the molding cavity and to form a tail.

6. The method of claim 5, further comprising the step of using the tail as a handler to handle the molds.

7. The method of claim 1, wherein the step of wrapping comprises the step of wrapping around the edges of the front mold and back mold with the interior surface of the strip in direct contact with the edges of the front mold and back mold.

8. The method of claim 5, further comprising the step of using a port, which is formed by the portion of the recess channel at the first end and the portion of the recess channel at the second end after the first end and the second end are fastened together, as a venting channel and a passage for establishing a fluid communication to the molding cavity.

9. A method for producing multiple types and powers of lenses using two molds without a gasket, each mold having an edge, comprising the steps of:
   a. positioning the two molds at a desired distance and rotational orientation relative to each other to form a particular lens type and power;
   b. wrapping an elastomeric strip around the edges of the two molds to form a cavity with the two molds, wherein the elastomeric strip has a first end and an opposed second end, an interior surface and an opposed outer surface, and a recess channel formed on the inside surface extending from the first end to the second end, and the cavity is in fluid communication with the recess channel;
   c. injecting a fluid lens-forming mixture into the cavity through the recess channel; and
   d. curing the fluid lens-forming mixture to form a lens with the particular lens type and power.

10. The method of claim 9, further comprising the step of adjusting the positions of the molds by movable vacuum fixtures engaged with the molds.

11. The method of claim 9, wherein the fluid lens-forming mixture is a monomer.

12. The method of claim 9, wherein the step of injecting the fluid lens-forming mixture further comprises the steps of:
   a. piercing the elastomeric strip by a filling needle so that the filling needle is in fluid communication with the recess channel; and
   b. injecting the fluid lens-forming mixture into the cavity through the filling needle.

13. The method of claim 9, wherein the step of wrapping comprises the step of wrapping around the edges of the two molds with the interior surface of the strip in direct contact with the edges of the two molds.

14. The method of claim 9, further comprising, after the step of curing the fluid lens-forming mixture, the step of separating the elastomeric strip and molds from the lens.

15. The method of claim 9, further comprising the step of fastening the first and second ends of the elastomeric strip together to close the cavity and to form a tail.

16. The method of claim 15, further comprising the step of using the tail as a handler to transfer the molds and the cured fluid lens-forming mixture.

17. An apparatus for molding a lens without using a gasket, comprising:
   a. a front mold and a back mold, each having a facing inside surface and an edge;
   b. means for positioning the front mold and the back mold at a desired distance and rotational orientation relative to each other so that the facing inside surfaces of the front mold and the back mold are a negative image of the surfaces of the lens; and
   c. a strip for wrapping around the edges of the front mold and the back mold to form a sleeve, wherein the strip has a first end and an opposed second end, an interior surface and an opposed outer surface, and a recess channel formed on the interior surface extending from the first end to the second end, and wherein the sleeve has a diameter and a longitudinal axis and cooperates with the front mold and the back mold to define a molding cavity, the molding cavity being in fluid communication with the recess channel.

18. The apparatus of claim 17, wherein the strip is made from a plastic film.

19. The apparatus of claim 18, wherein the plastic film is nonadhesive.

20. The apparatus of claim 18, wherein the plastic film comprises an elastomeric material selected from the group of polyurethane, polyvinyl chloride, organosilicon elastomer and thermoplastic rubbers containing a styrene-ethylene-propylene (butylene) block copolymer.

21. The apparatus of claim 18, wherein the thickness of the plastic film is between 1.0 millimeter and 8.0 millimeter.

22. The apparatus of claim 17, wherein the first and second ends of the strip are fastened together to close the molding cavity.

23. The apparatus of claim 22, wherein the two ends are fastened to form a tail.

24. The apparatus of claim 17, wherein the strip is wrapped around the edges of the front mold and the back mold with the interior surface of the strip in direct contact with edges of the two molds.

* * * * *